US006563998B1

(12) United States Patent
Farah et al.

(10) Patent No.: US 6,563,998 B1
(45) Date of Patent: May 13, 2003

(54) POLISHED POLYMIDE SUBSTRATE

(76) Inventors: John Farah, 60 Phillips St. Bld'g 3 Apt. 2, Attleboro, MA (US) 02703; Venkatapuram S. Sudarshanam, 1103 Strawberry La., Big Flats, NY (US) 14814-8947

( * ) Notice: Subject to any disclaimer, the term of this patent is extended or adjusted under 35 U.S.C. 154(b) by 0 days.

(21) Appl. No.: 09/292,432

(22) Filed: Apr. 15, 1999

(Under 37 CFR 1.47)

(51) Int. Cl.$^7$ ................................................. G02B 6/10
(52) U.S. Cl. ..................................................... 385/131
(58) Field of Search ............................. 216/18, 20, 83, 216/102, 2; 438/691, 753, 756, 757, 977; 526/245; 385/122, 132, 142, 143; 349/137, 201, 569, 570, 571

(56) References Cited

U.S. PATENT DOCUMENTS

| | | | | |
|---|---|---|---|---|
| 4,352,870 A | * | 10/1982 | Howard et al. | 430/271 |
| 4,834,480 A | * | 5/1989 | Baker et al. | 385/131 |
| 4,978,421 A | * | 12/1990 | Bassous et al. | 156/645 |
| 5,225,037 A | * | 7/1993 | Elder et al. | 156/644 |
| 5,231,682 A | * | 7/1993 | Khavand | 385/42 |
| 5,327,512 A | * | 7/1994 | Penner et al. | 385/3 |
| 5,943,464 A | * | 8/1999 | Khodja | 385/122 |
| 6,177,151 B1 | * | 1/2001 | Chrisey et al. | 427/596 |
| 6,208,791 B1 | * | 3/2001 | Bischel et al. | 385/129 |

OTHER PUBLICATIONS

R.A. Norwood, et al., "Fast, Low Insertion–loss Optical Switch Using Lithographically Defined Electromagnetic Microactuators and Polymeric Passive Alignment Structures", Applied Physics Letters, vol. 73, No. 22, pp. 3187–3189, Nov. 30, 1998.

J.C. Chon and P.B. Comita, "Laser Ablation Of Non–Linear Optical Polymers To Define Low–Loss Optical Channel Waveguides", Optics Letters, vol. 19, No. 22, pp. 1840–1842, Nov. 15, 1994.

V.S. Sudarshanam, et al., Linear Readout Of Dynamic Phase Change In A Fiber–Optics Homodyne Interferometer, Optics Letters, vol. 14, No. 2, pp. 140–142, Jan. 15, 1989.

* cited by examiner

*Primary Examiner*—Akm E. Ullah

(57) ABSTRACT

Polymer substrates, in particular polyimide substrates, and polymer laminates for optical applications are described. Polyimide substrates are polished on one or both sides depending on their thickness, and single-layer or multi-layer waveguide structures are deposited on the polished polyimide substrates. Optical waveguide devices are machined by laser ablation using a combination of IR and UV lasers. A waveguide-fiber coupler with a laser-machined groove for retaining the fiber is also disclosed.

54 Claims, 7 Drawing Sheets

POLISHED POLYMIDE SUBSTRATE

CROSS-REFERENCE TO OTHER PATENT APPLICATIONS

This application claims the benefit of U.S. provisional Patent Application No. 60/082,267, filed Apr. 17, 1998, and of U.S. provisional Patent No. 60/128,863, filed Apr. 12, 1999.

GOVERNMENT FUNDING

This invention was supported by Department of Energy Grant No. DE-FG02-90ER81033, and the government has certain rights to the invention.

FIELD OF THE INVENTION

This invention relates to polished polyimide substrates and polymer laminate structures formed on those substrates, and more particularly, to polymer devices for optical applications.

BACKGROUND OF THE INVENTION

Optical waveguide devices are typically made on silicon substrates. It is desirable that materials used for optical waveguide devices exhibit certain optical, thermal and mechanical characteristics, besides low optical loss. Common silicon micromachining technologies include anisotropic chemical etching and reactive ion etching (RIE). Passive optical waveguides exhibiting acceptable losses between 0.1 and 10 dB/cm have been demonstrated in a number of materials, most notably optical grade glasses (silica) and PMMA and polystyrene polymers. The highest quality silica waveguides with very low losses of 0.1 dB/cm have been deposited on silicon wafers by the flame hydrolysis technique which yields good control over the index and thickness of the film but requires heating the porous glass layer to 1250° C. for consolidation. This high temperature perturbs the crystallographic micro-structure of silicon which affects its anisotropic chemical micromachining. Furthermore, the flame hydrolysis technique requires specialized and expensive equipment and involves the use of silane which is a toxic gas.

The fabrication of channel silica ridge waveguides requires deep RIE of several microns. Also vertical deep sidewalls and high aspect ratios, which are desirable in a micro-mechanical structure, such as accelerometer, can be achieved in silicon with deep RIE. However, RIE is an expensive process and requires use of high vacuum equipment which is prone to frequent failure. Furthermore, another problem with deep RIE is the erosion of the masking layer due to poor selectivity, which limits the etch depth in the silica film to the thickness of the masking layer, which is usually on the order of one micron. The selectivity of RIE can be improved with the proper selection and careful control of process parameters such as pressure and voltage. However, maintaining careful control over process parameters and finding a suitable masking material for a certain film can be limiting factors in the use of RIE.

It is desired in certain applications to incline the end faces of cantilevered film waveguides relative to the axis of the waveguide, especially at air gaps between cantilevered and fixed waveguides. This cannot be readily achieved with RIE because the electric field lines in a plasma, which define the trajectory of the energetic ions doing the etching, terminate perpendicularly to the wafer surface. Thus, the desired oblique walls at the end faces cannot be obtained with silicon micromachining technology.

Silicon micromachined cantilevers carrying film waveguides have made use of films such as silicon dioxide (silica) and nitride. However, there are problems associated with fabricating micro-structures from the bulk of silicon substrates, such as the undercutting of convex corners which alters the shape of micro-structures, e.g. the inertial mass at the end of a cantilever. This prevents the reproducible fabrication of microstructures with 90° corners such as accelerometers. This problem can be partially corrected with the use of proper corner compensation in the mask layout, however this requires significant experimentation by trial and error to determine the correct compensation for each mask design. Another problem with using silica films for waveguides in micro-mechanical applications which is not encountered in micro-electronic processing is that thick films (up to 15 $\mu$m) are needed. The problem with such films is that they tend to crack and peel off due to the large residual stresses built-in during the deposition. Furthermore, the deposition of silica films is not compatible with silicon micromachining because it requires heating the wafer to a very high temperature which can affect the crystallinity of silicon on which anisotropic etching depends. Another drawback of high silica films is the necessity of deep RIE to form ridge waveguides, which is an expensive process and which is limited to etching thin films (below 1 $\mu$m) due to mask erosion.

Certain polymers have been used as waveguide materials. Low loss polymer waveguides have been most commonly achieved in poly-methyl-methacrylate (PMMA) or polystyrene. However, a limitation of PMMA is its poor thermal and environmental stability. For example, polyimides are affected by bases such as KOH or NaOH, which are used in anisotropic chemical silicon micromachining.

The use of polyimides on silicon presents problems in regards to wet and dry etching and to the mismatch in the coefficient of thermal expansion, so that polyimide films on silicon wafers tend to have limited utility in fabricating micromachined structures for optical waveguiding applications. For optical applications it is desired to cure polyimide films at temperatures not exceeding 250° C. in order to reduce optical losses.

The residual side wall angle of a wet etched air gap or slit is unpredictable due to the swelling when a developed film dries at elevated temperatures. This is aggravated in the case of a multilayered film wherein solvent attack at the interfaces between the layers results in uneven surfaces at the end faces of the film.

When a silicon wafer carrying a polymer film is cut or cleaved, the polymer film waveguide tends to lift off the cut edge of the wafer. The width of the lifted-off regions can extend up to 300 $\mu$m inward from the edge. This necessitates removing the entire lifted region of the film, such as for example by ablating with a laser to improve coupling of light in and out of the waveguide. However, this is problematic because it creates a relatively long step that the light must traverse between edge of the wafer and edge of the film. If this step is at the input edge of the waveguide where light is focused as a cone or wedge then a substantial portion of the light can be blocked off. Whereas if the step is at the output edge then it interferes with the collection of the light by a lens for feeding into a pick up fiber. This step is particularly problematic over silicon wafers. It was necessary to control the end face of a polymer channel waveguide within 5 $\mu$m from the cleaved silicon substrate edge in order to achieve acceptable coupling of the light (J. C. Chon and P. B. Comita, "Laser ablation of nonlinear-optical polymers to define low-loss optical channel waveguides", Opt. Lett. 19, 1840, 1994). The cleavage of the silicon wafer must be done very carefully so that the least amount of film is peeled off at the cleaved edges.

To couple light in and out of waveguides single mode optical fibers are typically attached to single mode channel waveguides. This requires alignment of the axes of the fiber and waveguide with submicron accuracy. For example, V-grooves can be etched in silicon substrates and the alignment between the fiber and waveguide is adjusted while actively monitoring the coupling efficiency. At the point of maximum efficiency, the fiber is attached to the substrate. It would be desirable to couple light efficiently between single mode fiber and waveguide passively without monitoring the light intensity during the attachment.

It would therefore be desirable to provide a flexible polyimide substrate and a polymer laminate wherein the materials used for the different layers are highly compatible in terms of thermal, mechanical, chemical and machining properties.

It would also be desirable to cost-effectively fabricate, for example, by laser processing in a polymer or a polymer laminate a micro-structure, for example, a micro-mechanical cantilevered waveguide.

It would also be desirable to couple light efficiently and passively between a single mode fiber and a single mode waveguide.

It would also be desirable to fabricate an opto-mechanical device, such as an accelerometer incorporating a micromachined cantilevered waveguide.

SUMMARY OF THE INVENTION

This invention is directed to polished polyimide substrates for optical applications, and to polymer laminate structures fabricated using the polished substrates.

According to one aspect of the invention, a polyimide substrate has one or two polished sides with a surface roughness between about 0.5 $\mu$inch and about 100 $\mu$inch. A polymer waveguide layer can be disposed on a polished side of the polyimide substrate, with the polymer waveguide layer having a refractive index that is greater than a refractive index of the polyimide substrate and a thickness so as to support at least one guided optical waveguide mode in the polymer waveguide layer. A first polymer cladding layer can be disposed between the polyimide substrate and the polymer waveguide layer, with the first polymer cladding layer having a refractive index that is smaller than the refractive index of the polymer waveguide layer.

According to another aspect of the invention, a method is disclosed for forming a polymer waveguide structure on a polymer substrate. A first shape of the optical device is defined in the polymer waveguide structure using a first laser beam emitting in the IR spectral range, and a second shape of the optical device is defined in the polymer waveguide structure using a second laser beam emitting in the UV spectral range. The first laser beam separates the polymer waveguide structure at least partially from the polymer substrate, whereas the second laser beam produces a gap between the at least partially separated polymer waveguide structure and a remaining portion of the polymer waveguide structure so as to form a cantilevered waveguide structure. The end face of the cantilevered waveguide structure facing the gap may be perpendicular or inclined with respect to a surface normal of the polymer substrate.

In one embodiment, the first laser beam impinges in a first area on a backside of the polymer substrate opposite the polymer waveguide structure, causing ablation of the polymer substrate in the first area without ablating the polymer waveguide structure. The second laser beam impinges on the polymer waveguide structure in a second area overlapping with, but smaller than the first area, causing ablation of the polymer waveguide structure and forming an air gap, thereby forming a cantilever. The air gap releases the cantilever, allowing the released cantilever to pivot about a flexible portion located opposite the air gap.

According to yet another embodiment of the invention, a method is disclosed for forming a groove in a polymer laminate which includes a polyimide substrate and an optical waveguide for coupling light between the optical waveguide and an optical fiber. The method includes directing a laser beam on the polymer laminate with a predetermined angle with respect to a surface normal of the polymer laminate and ablating the polymer laminate to form a groove substantially collinear with the optical waveguide. The groove has a bottom so that a waveguide center of the optical fiber inserted in the groove and contacting the bottom is substantially coincident with the center of the optical waveguide in a direction of the surface normal. The predetermined angle can be adjusted so that sidewalls of the groove are tapered so as to narrow from the bottom of the groove towards the optical waveguide so as to securely hold the optical fiber in the groove.

DETAILED DESCRIPTION OF CERTAIN ILLUSTRATED EMBODIMENTS

Figure 1:
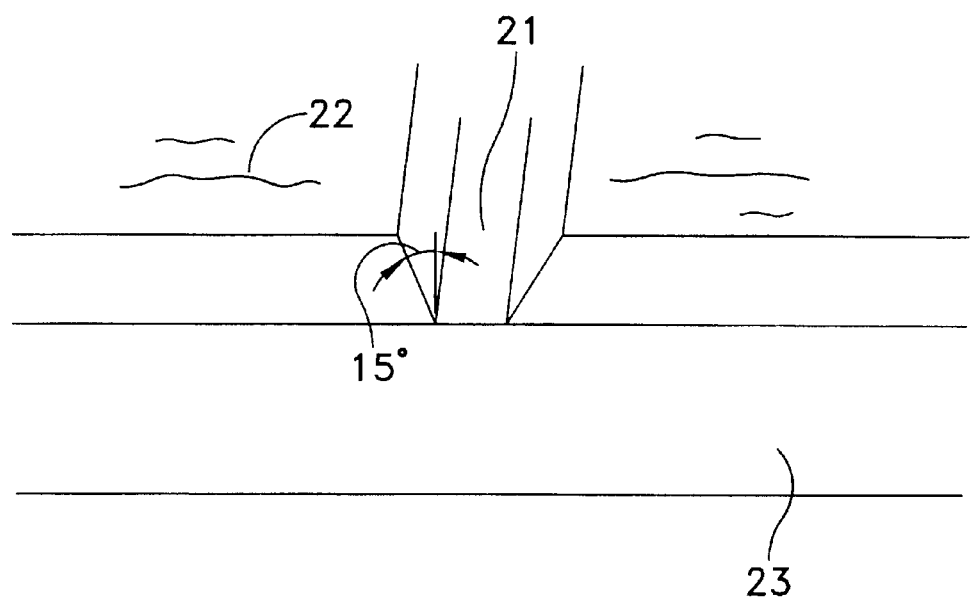
FIG. 1 shows schematically a slit of width 3 $\mu$m ablated in a Probimide 412 film using an excimer laser as seen in a SEM image.

This invention provides materials and methods suitable for fabrication of a waveguide in polyimide substrate or in a polymer structure disposed on a flexible polyimide substrate. The invention also provides a micromachined cantilever supporting an optical waveguide, as well as a laser micromachining process which allows achievement of desired waveguide end face inclination. The combination of materials disclosed herein achieves advantageous optical, mechanical, processing and thermal properties.

This invention uses excimer laser ablative micromachining as a replacement for chemical etching of micro-electromechanical systems (MEMS) and opto-microelectromechanical systems (OMEMS). This process is cost-effective and avoids wet development in the fabrication of micro-structures which can result in distortion of film waveguides due to swelling of the film in the presence of a solution.

Polyimide substrates suitable for use in this invention are flexible with a modulus of elasticity ranging between 1 and 10 GPa. These polyimide substrates are generally at least 200 $\mu$m thick, but thinner membranes can be used. The polyimide material can preferably withstand temperatures such as those encountered in polishing without significant degradation of the physical and mechanical properties. The surface of the polyimide material can be polished to achieve a surface roughness in the range between about 0.5 $\mu$inch and about 100 $\mu$inch, preferably in the range between about 1 $\mu$inch and about 50 $\mu$inch, most preferably in the range between about 5 $\mu$inch and about 20 $\mu$inch. VESPEL® is a suitable polyimide material commercially available from DuPont, which can be machined into a suitable substrate and which can operate continuously from cryogenic temperatures to 260° C. in air, to 315° C. in inert environments or vacuum, and can withstand temperatures up to 482° C. for short durations. It is tough yet compliant which makes it suitable for a flexible substrate. Because of its inherent mechanical strength, stiffness and dimensional stability at machining temperatures, VESPEL® can be machined with the use of standard metalworking equipment. It can also be ground, buffed, polished and lapped. The thickness of a polished wafer can vary along the radius.

VESPEL® is a mechanically sturdy, visually opaque, brown colored polyimide which is available commercially in the form of circular discs or rods of about 2 inch diameter and thickness of about 0.25 inch. These disks are too thick to be used as wafers. In the present invention VESPEL® polyimide is cut from bulk cylinders and polished to form wafers or substrates, on which films are deposited. VESPEL® wafers of any thickness are obtained by cutting and polishing the VESPEL® discs. The thickness of the wafer can vary along the radius. For example, the inner portion around the center of the wafer can be thin as a membrane while the outer portion near the perimeter of the wafer can be thicker as a ring, or vice versa. VESPEL® polyimide is also available in other forms, such as rods, plates, plaques, and bars, which can be used to form substrates. VESPEL® bulk forms which are made from either SP or ST polyimide resins can be used to form substrates useful for this invention.

VESPEL® discs about 2 inch in diameter and about 0.25 inch thick were sliced to form thin wafers having a thickness of about 300 $\mu$m, 625 $\mu$m, and 1 mm, respectively, and to form thick wafers having a thickness of about 1.5 mm. The thin wafers were subsequently polished on both sides to a surface finish better than about 2 $\mu$inch. This yielded flat VESPEL® wafers with uniform thickness and reflective surfaces ready for film deposition. Polishing of the VESPEL® surface improved the reflectivity significantly.

The thick wafers were lapped and polished on one side to make it reflective and capable of accepting a waveguiding film on the reflective surface. The thick wafer remained flat after polishing. This yielded VESPEL® wafers that were planar, smooth and highly reflective. While both thin and thick VESPEL® wafers can be made flat, smooth and reflective, it is preferable to reduce post-slicing polishing work by starting with a thicker wafer and polishing only one side of the wafer rather than starting with a thinner wafer and polishing both sides of the wafer.

Laminate waveguide structures were deposited on polished VESPEL® substrates using organic materials, in particular polyimide films, with a glass transition temperature greater than 200° C., and having a thickness of between 0.1 $\mu$m and 10 $\mu$m. Deposition methods include, for example, spinning, dipping, spraying, or coating. Polymeric waveguides can be obtained as free standing films which can be glued onto the substrate or spun cast from solutions. The waveguiding laminates can be photoimageable and pre-imidized polyimides, such as for example the Probimide® 400 series manufactured by OCG Microelectronics Materials Inc., Providence, R.I.; the Ultradel™ 9000 series manufactured by Amoco Chemical Co., Naperville, Ill.; Epotek® manufactured by Epoxy Technology, Inc., Billerica, Mass.; Polyguide™ manufactured by DuPont Company, Wilmington, Del.; C20, C21, CE or DT manufactured by AlliedSignal, Inc., Morristown, N.J.; and BCB series or PFCB series manufactured by DOW Chemical Company, Midland, Mich.

Probimide is a photosensitive and non-fluorinated polyimide. Channel waveguides can be fabricated in Probimide 400, without etching or material removal, by doping it with photoinitiators, such as benzoin ethyl ether, or benzildimethylketal. Subsequently, the Probimide film is exposed selectively through a mask to UV radiation which causes crosslinking of the dopant to the polymer matrix in the regions of the film where the dopant is exposed to the UV radiation. The index of refraction of Probimide 400 decreases in the regions of the film where the dopant remains photolocked. In masked unexposed areas the dopant which does not photolock evaporates from the material upon hard baking leaving the pure Probimide with the higher index of refraction behind.

Ultradel 9000 series is a photosensitive and fluorinated polyimide which contains an alkylated photocrosslinking group. Channel waveguides can be fabricated in Ultradel, without etching or material removal, by doping it with chromophores and subsequently exposing it selectively through a mask to UV radiation which bleaches the chromophores in the regions of the film where the dopant is exposed to the UV radiation. The presence of the chromophores raises the index of the polyimide. After bleaching, the index of the exposed regions of the film returns to its original value.

Polyguide films contain low molecular weight acrylate and methacrylate monomers. These monomers diffuse within a polymer binder matrix and polymerize when exposed to UV light thereby changing the index of refraction of the polymer. Channel waveguides can be fabricated in Polyguide sheets, without etching or material removal, by exposing it selectively through a mask to UV radiation. Multimode as well as single mode waveguides can be fabricated in Polyguide polymer sheets.

The series of polymers known as C20, C21, CE and DT are based on combinations of acrylate monomers. Photosensitive polymerization initiators are added to the monomer mixtures to provide a means for photochemical polymerization. Upon photoinitiation these monomer mixtures form crosslinked polymeric structures that exhibit low optical loss. The C20 and C21 polymers are non-halogenated hydrocarbon acrylates. Whereas CE and DT are partially halogenated with monomers, such as for example fluorine or chlorine, which lower the optical loss. The CE material is a copolymer of a halogenated monomer and a hydrocarbon monomer. The DT material is a copolymer of partially fluorinated monomers. These monomers have a low molecular weight and are not solvent-borne. They contain 100% solid monomers. Multimode as well as single mode waveguides have been made in these polymers by molding, both injection molding of thermoplastics as well as casting of thermosets or photosets. Waveguides and in particular single mode waveguides are fabricated by photochemical polymerization of the monomers with the use of laser writing or photolithography. Several meter long single or multimode polymer waveguides can be laser-written on large substrates such as for example rolls of flexible plastic.

This all-organic laminate has at least a polished polyimide substrate and a polymer or polyimide waveguiding film deposited on the substrate. An optional optical buffer layer can be used to separate the waveguiding film from the polyimide substrate, and an optional upper cladding layer can be used on top of the waveguiding film. Each layer has a thickness in the range specified above. The all-organic laminate demonstrates compatibility of the mechanical, thermal, chemical and optical properties of all the layers and specifically closeness of the coefficients of thermal expansion of the layers in the laminate, which minimizes residual stresses. The deformation and warpage of the laminate and the delamination and/or cracking of the film are thus reduced when subjected to baking cycles.

Organic planar waveguides were fabricated by depositing Probimide 412 and Epotek layers on top of polished VESPEL® substrates. Probimide 412 has a refractive index of 1.62. Two Epotek polyimides, namely 600-3 and 390-1 of index less than 1.625 were used as optical buffer layers between the Probimide 412 core layer and two polished VESPEL® substrates. In one laminate Epotek 600-3 was used. In the other laminate Epotek 390-1 was used. Thus, these laminates included a polished VESPEL®) substrate, an Epotek buffer layer (lower cladding) and a Probimide 412 waveguiding (core) layer. No upper cladding (on top of Probimide 412) was used. These Probimide-on-Epotek-on-VESPEL® laminates are referred to hereafter as PEV wafers or PEV laminates. Polymer waveguides can also be prepared as free standing films and subsequently glued to the substrate.

The deposition procedure for PEV laminates included the following steps: A polished VESPEL® substrate was cleaned with methyl alcohol and dehydration baked at 100° C. for 30 min. One ml of Epotek was spun on top of it. The spinning cycle consisted first of spinning at 500 rpm for 10 sec, followed by a ramp to the final speed of 1500 rpm for 25 sec. The Epotek film was subsequently soft-baked. One ml of Probimide 412 was then spun on the wafer first at 500 rpm for 10 sec followed by a ramp to the final speed of 2500 rpm for 25 sec. The Probimide 412 film was then soft-baked for 3 min at 110° C. on a hot plate and then for 30 min at 110° C. in a convection oven under nitrogen purge. The wafer was subsequently flood exposed to UV light at 365 nm for a total exposure energy density of 1200 mJ/cm$^2$. The wafer was then hard baked in a convection oven at 200° C. for 30 min under nitrogen purge. The curing temperature in the oven was ramped at the rate of 5° C./min to the final temperature of 200° C. The wafer was left in the oven to cool down to room temperature.

The recommended soft-baking conditions for Epotek 600-3 and Epotek 390-1 are 150° C. for 30 min and 150° C. for 1 hr, respectively.

The Epotek 600-3 and 390-1 polyimides have different compositions and properties such as viscosity and adhesion. The viscosity of Epotek 390-1 is about 500 cps, while that of Epotek 600-3 ranged between about 200 and about 2000 cps. Thus, the thickness of the Epotek and Probimide layers spun on top of the VESPEL® substrates were different for both cases as these depend on the viscosity and adhesion properties of the layers. The thickness of the Epotek layers on PEV wafers #1 and #2 were 1.1198 and 2.6347 μms, respectively.

Epotek adheres well to VESPEL® and does not need an adhesion promoter when spun over VESPEL® substrates. However, a two-layer laminate having a polymer film, such as for example Probimide 412 deposited directly on top of a polished VESPEL® wafer can be fabricated. The deposition of Probimide 412 directly on VESPEL® requires a thin layer of adhesion promoter in between. The deposition procedure for the adhesion promoter layer is as follows: the VESPEL® substrate is first baked for dehydration at about 100° C. for about 30 min. One part of QZ 3289 adhesion promoter concentrate and nine parts of QZ 3290 diluent, manufactured by OCG microelectronics, are mixed to form the adhesion promoter which is spun on the VESPEL® wafer at about 4000 rpm for about 20 seconds and baked on a hot plate at about 100° C. for about 20 seconds.

Organic planar waveguides were also fabricated by depositing Ultradel 9020D films on top of polished VESPEL® substrates. Ultradel was deposited directly on top of a polished VESPEL® surface in the absence of an adhesion promoter. Ultradel has a refractive index of about 1.55. These laminates included a polished VESPEL® substrate and an Ultradel 9020D layer. These Ultradel-on-VESPEL® laminates are referred to hereafter as U-V wafers or U-V laminates.

The deposition procedure for U-V laminates included the following steps: A polished VESPEL® substrate was cleaned with isopropyl alcohol and subjected to ultrasound waves for 20 min to shake dust particles off the surface. After cleaning, the VESPEL® wafer was dehydrated in a vacuum oven at a temperature of 120° C. for 30 min. Then Ultradel was spun at 500 rpm for 30 sec, followed by 60 sec at the desired final speed. This was followed by soft-baking at 110° C. for 15 min to dry the film from the γ-butyrolactone solvent. After soft-bake the film was flood (maskless) exposed to UV light at 365 nm for a total exposure energy density of about 900 mj/cm$^2$. Finally, the Ultadel film was cured at 250° C. for 1 hr and 45 min. The wafers were introduced to the oven at 100° C. The oven was then evacuated and its temperature was ramped to 250° C. at the rate of 1° C./min. The wafers were soaked at 250° C. for 1.75 hours to cure and then cooled down gradually to room temperature at the rate of 1° C./min while in the evacuated oven.

It is necessary to prepare the input and output end faces of waveguiding films on VESPEL® substrates to couple light in and out of the waveguide, and to prepare the air gap between a cantilevered waveguide and a fixed waveguide. The input and output end faces are polished, such as for example by dicing with a diamond blade, whereas the narrow air gap of only a few microns between two waveguide end faces can be fabricated by laser ablation. The input and output end faces are also ablated. However, the dicing technique can be more cost-effective for preparing the input/output edges of the film.

For precise micromachining, such as the fabrication of an air gap between two waveguides and for preparation of input and output end faces of waveguiding films, a light source whose spot size can be focused to below 10 μm, such as for example an excimer laser is used.

It is sometimes desirable to cut or separate a VESPEL® substrate carrying a film into many pieces in order to isolate different devices or for packaging. This is achieved either by dicing such as for example with a diamond blade, or by cutting with an intense IR laser such as for example a $CO_2$ laser, or by ablating with an excimer or any other suitable laser, such as for example a YAG laser. Polymer materials absorb at UV wavelengths, therefore any laser whose frequency can be doubled or tripled to yield a UV wavelength and whose spot size can be focused to below 10 μm to yield smooth ablated edges can be used. In the case of dicing with a diamond blade or cutting with a $CO_2$ laser, the depth of the cut usually encompasses the thickness of the VESPEL® wafer. However, in the case of ablation with a laser it is not necessary to ablate throughout the whole thickness of the VESPEL® wafer. It is often sufficient and more economical to ablate through the thickness of the film and to continue the ablation to a certain depth, such as for example about 100 μm into the VESPEL® wafer. Structural weakening of the wafer along the scribing line allows cleaving of a VESPEL® wafer in a manner similar to a silicon wafer. Cleaving by hand is a simple and clean method of breaking a spin coated VESPEL® wafer into small pieces.

A deep vertical step was ablated into a VESPEL® wafer under a lifted-off region of the polymer waveguiding film near the edge in order to clear the path of the light. The depth of the step needs to be enough to clear the path of the light and depends on the numerical aperture of the focusing optics, such as for example 100 μm. A VESPEL® wafer is cleaved first by scribing with an excimer laser and then breaking by hand. This procedure for separating a VESPEL® wafer avoids lifting the film off the edge of the substrate.

A 2 inch diameter PEV wafer was diced into rectangular pieces each with a propagation length of 1.98 cm. A decaying streak was observed in these diced pieces when light was coupled into the waveguides by end-firing. The attenuation in dB/cm in the diced PEV waveguides was measured with the prism coupler, as described below.

EXAMPLE 1

Waveguiding Laminate Incorporating an Epotek 600-3 Buffer Layer

The general structure of the PEV laminate was outlined above. A VESPEL® substrate made of SP-1 polyimide having a single polished side was cleaned and dried. One ml of Epotek 600-3 was spun on to the polished surface first at 500 rpm for 10 sec followed by a ramp to the final speed of 1500 rpm for 25 sec, and soft-baked for 30 min at 150° C. One ml of Probimide 412 was then spun on top of the Epotek layer first at 500 rpm for 10 sec followed by a ramp to the final speed of 2500 rpm for 25 sec. The Probimide 412 film was then soft-baked for 3 min at 110° C. on a hot plate and then for 30 min at 110° C. in a convection oven under nitrogen purge. The wafer was subsequently flood exposed to UV light at 365 nm for a total exposure energy density of 1200 mJ/cm$^2$ and then hard baked in a convection oven at 200° C. for 30 min under nitrogen purge. The curing temperature in the oven was ramped at the rate of 5° C./min to the final temperature of 200° C. The wafer was left in the oven to cool room temperature. This wafer is referred to as PEV wafer #1. The thickness and the refractive index of the Probimide 412 layer was about 4.4478 μm and 1.6236, respectively, and that of the Epotek 600-3 layer about 1.1198 μm and 1.5733, respectively.

EXAMPLE 2

Waveguiding Laminate Incorporating an Epotek 390-1 Buffer Layer

In this example, one ml of Epotek 390-1 was spun on top of the polished surface. The Epotek film was soft-baked at 150° C. for 1 hour. The subsequent deposition and treatment was identical to that of Example 1 above. This wafer is referred to as PEV wafer #2. The thickness and the refractive index of the Probimide 412 layer was about 5.4115 μm and 1.6232, respectively, and that of the Epotek 600-1 layer about 2.6347 μm and 1.5700, respectively.

If the Probimide 412 layer is deposited directly on the VESPEL® substrate, the use of an adhesion promoter, such as one part QZ 3289 diluted in nine parts of QZ 3290 (distributed by OCG Microelectronics) is suggested.

EXAMPLE 3

Waveguiding Layer Made From Ultradel 9020D Without a Buffer Layer

Ultradel with a refractive index of about 1.55 can be deposited directly on a polished VESPEL® surface without an adhesion promoter. These Ultradel-on-VESPEL® laminates will be referred to hereafter as U-V wafers or U-V laminates.

The deposition procedure for U-V laminates included the following steps: A polished VESPEL® substrate was cleaned with isopropyl alcohol and subjected to ultrasound waves for 20 min to shake dust particles off the surface. After cleaning, the VESPEL® wafer was dehydrated in a vacuum oven at a temperature of 120° C. for 30 min. Then Ultradel was spun at 500 RPM for 30 sec, followed by 60 sec at the desired final speed. This was followed by soft-baking at 110° C. for 15 min to dry the film from the γ-butyrolactone solvent. After soft-bake the film was flood (maskless) exposed to UV light at 365 nm for a total exposure energy density of about 900 mJ/cm$^2$. Finally, the Ultadel film was cured at 250° C. for 105 min. The wafers were introduced into the oven at 100° C. The oven was then evacuated and its temperature was ramped to 250° C. at the rate of 1° C./min. The wafers were soaked at 250° C. for 1.75 hours to cure and then cooled down gradually in the evacuated oven to room temperature at the rate of 1° C./min.

A commercial Metricon PC 2000 prism coupler manufactured by Metricon Corporation, in New Jersey was utilized to measure the index and thickness of the Probimide films. The prism coupler was modified to enable attenuation measurements in the waveguides. Two intensity measurements were recorded for each point of light injection, namely the light reflected off the film at the injection point, and the light exiting the waveguide. The ratio of transmitted to reflected intensities was plotted vs. propagated distance to obtain the propagation loss figure in dB/cm.

The VESPEL® substrate can be separated into individual dies either by cutting with, for example, a diamond blade, an IR laser, such as a $CO_2$ or YAG laser, or since polymer materials absorb at UV wavelengths, with an excimer or any other suitable laser. An excimer laser with a spot size of 10 μm or less typically produces smooth ablated edges. Mechanically or laser-induced scribe lines can facilitate the dicing process.

An exemplary Probimide 412 waveguide film spun on a VESPEL® wafer was ablated with a Lambda Physik ArF laser emitting at 193 nm pulsed at the rate of 40 Hz with an energy density of 5.679 j/cm$^2$.

Air gaps of widths 3, 5, 7 and 10 μms were fabricated in a Probimide 412 film by ablation with an excimer laser.

EXAMPLE 4

3 μm Wide Air Gap Ablated by Excimer Laser

Referring first to FIG. 1, a Probimide 412 film 22 disposed on a PEV wafer 23 of type #1 was ablated with an ArF excimer laser operating at 193 nm, forming a 3 μm wide air gap 21. The fluence of the ArF excimer laser beam was 5.679 J/cm$^2$ and the pulse repetition rate was 40 Hz. The fluence, repetition rate and pulse width were controlled with a computer. The laser beam was homogenized with a high-power beam homogenizer (IMS-50). The homogenizer lens array overlaps four beamlets to provide a single image with a square-top intensity profile for uniform ablation. A 15×or 36×Ealing Optics Schwarzschild reflecting objective was used to image the aperture onto the workpiece being ablated. The image consisted of an area (180×180 μm$^2$) on the workpiece. Alternatively, the excimer laser beam is focused onto the workpiece for scribing. The workpiece was mounted on a computerized x-y stage for scanning during the ablation process. The workpiece was oriented to be either perpendicular or inclined by an angle of 30° relative to the laser beam in order to yield vertical or inclined end faces of the air gap, respectively. Each of the focussed beams had a numerical aperture of 0.25 corresponding to a half cone angle of 15°. The angle between the axes of the beams was about 30°. The side wall angle obtained with laser ablation is straight and planar even in a multilayered film.

EXAMPLE 5

10 μm Wide Inclined Air Gap Ablated by Excimer Laser

Figure 2:
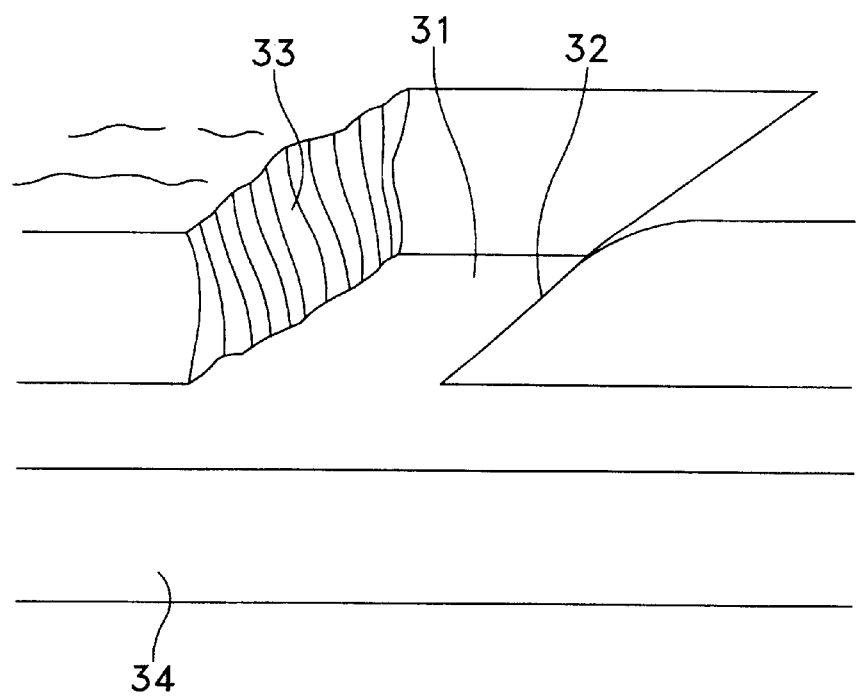
FIG. 2 shows schematically an inclined slit of width 10 $\mu$m ablated in a Probimide 412 film using an excimer laser as seen in a SEM image.

Referring to FIG. 2, a Probimide 412 film 33 disposed on a PEV wafer 34 of type #1 was ablated with an ArF excimer laser under the same operating conditions as in Example 4, with the stage on which the wafer was mounted being inclined at an angle of 30° relative to the ablating excimer laser beam to obtain inclined walls of the air gap. A 10 μm wide air gap 31 with inclined walls 32 was formed. The walls of the air gap were planar. The inclination of the walls of approximately ±15° again corresponds to the cone angle of the focused ablating laser beam. The walls of the air gap can be made more parallel, whether vertical or inclined, by reducing the numerical aperture of the optical delivery system in the ablation machine.

The quantity of debris released by ablation can be reduced by increasing the fluence and the pulse repetition rate of the ablating excimer laser beam.

The losses introduced by the air gap were estimated by comparing the losses with and without the air gap. Similarly to the attenuation measurement technique described above, the normalized intensity was measured for a given propagation distance in the presence of the air gap. The wafer was then moved laterally a small distance so that the path of the guided light cleared the air gap and the losses were measured again in the absence of the air gap. The difference in dB between these two measurements provided the air gap loss.

To produce a cantilever beam, a cut is advantageously provided through the thickness of a VESPEL® wafer, for example, by using a pulsed $CO_2$ laser, although a cantilever beam can be fabricated entirely by ablation, for example, using an excimer laser. The pulse width of the $CO_2$ laser beam is at least approximately 0.5 ms. The $CO_2$ laser beam is controlled by a computer which stores AutoCad data representing the contour of the cantilever. The cantilever contour was formed in a single traversal of the wafer by the laser beam.

The minimum spot size achievable with a typical $CO_2$ laser is typically about 50 to 75 μm, which tends to produce ragged edges in the waveguide film, causing light scattering and adversely affecting the optical performance of the device.

Moreover, debris produced by $CO_2$ laser cutting can deposit on the organic laminate and interfere with its wave guiding properties. This can be prevented by flipping the VESPEL® wafer carrying the organic laminate upside down, so that the $CO_2$ laser beam impinges on the uncoated back surface of the VESPEL® wafer. In this way, the $CO_2$ laser beam cuts through the bulk of the VESPEL® wafer first before reaching the waveguide film. Any remaining debris which deposits on the waveguide end faces can subsequently be removed by excimer laser ablation.

Most of the cantilever shape is fabricated with the $CO_2$ laser, except for a narrow region at the location where the air gap is formed by excimer laser ablation. However, the width of the narrow region can be increased by also using the $CO_2$ laser beam. The narrow region in the VESPEL® wafer can be ablated with excimer laser concurrently with the formation of the air gap. The $CO_2$ laser does not release the cantilever completely but keeps it suspended from the narrow region. Ablation of the air gap in the organic film and concurrent ablation of the VESPEL® material underneath it releases the cantilever, which then can freely respond to acceleration or displacement.

The procedure for releasing the cantilever and forming the air gap utilizes two consecutive steps:
  (i) ablating from the uncoated back surface of the VESPEL® wafer to a depth short of ablating through the whole thickness of the wafer and a width larger than the desired width of the air gap, and
  (ii) ablating from the side carrying the waveguide film to the remaining depth of the wafer and a width equal to the desired air gap. To accommodate a larger tolerance in the placement of the air gap within the ablated area across the visually opaque VESPEL® wafer, the area ablated from the uncoated back side of the wafer is made wider than the desired air gap width.

It is preferred that the step of $CO_2$ laser cutting precede the dicing and excimer laser ablation steps. It is also preferred that the last step in the fabrication process be the ablation step.

Accordingly, the fabrication of a cantilever includes: cutting the shape of the cantilever with $CO_2$ laser without releasing it, ablating the narrow region of the VESPEL® wafer with excimer laser and ablating the air gap concurrently to release the cantilever, and ablating the input/output edges of the waveguide film with an excimer laser, not necessarily in this order.

EXAMPLE 6

Laser Micromachined Cantilever Beam with Ablated Input/Output Edges

A cantilevered waveguide was fabricated in a PEV wafer of type #2 according to the procedure outlined above by following the sequential steps of:
  (a) forming an unreleased cantilever contour by cutting the VESPEL® wafer with a $CO_2$ laser,
  (b) ablating the input/output edges of the waveguide film with an excimer laser, and (c) ablating the narrow region of the VESPEL® wafer with the excimer laser and ablating the air gap concurrently to release the cantilever.

Figure 3A:
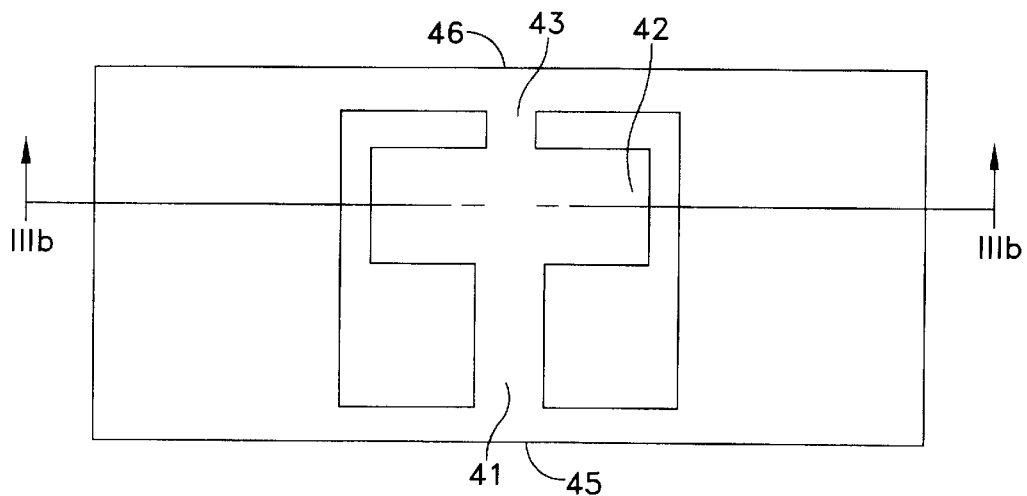
FIG. 3*a* shows schematically a top view of a cantilever structure before release, machined in a VESPEL® substrate using a $CO_2$ laser.
Figure 3D:
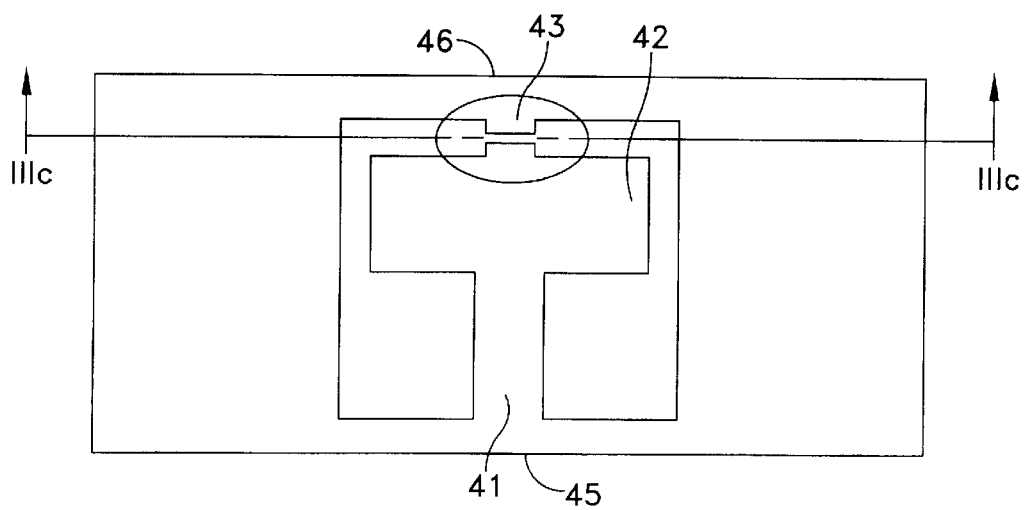
FIG. 3*d* shows schematically a top view of the cantilever structure of FIG. 3*a* after release by ablation of the gap with an excimer laser.
Figure 3B:
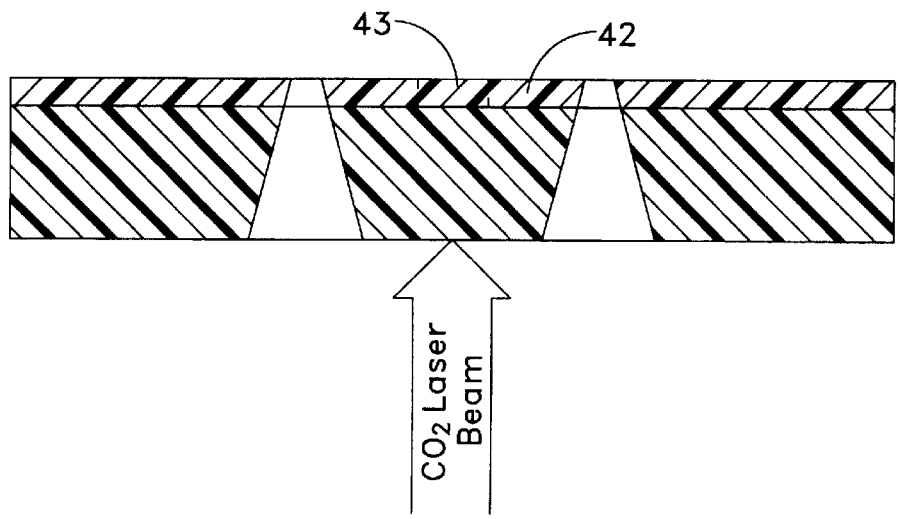
FIG. 3*b* shows schematically a cross-sectional view of the cantilever structure of FIG. 3*a* taken along the line III*b*—III*b*.
Figure 3C:
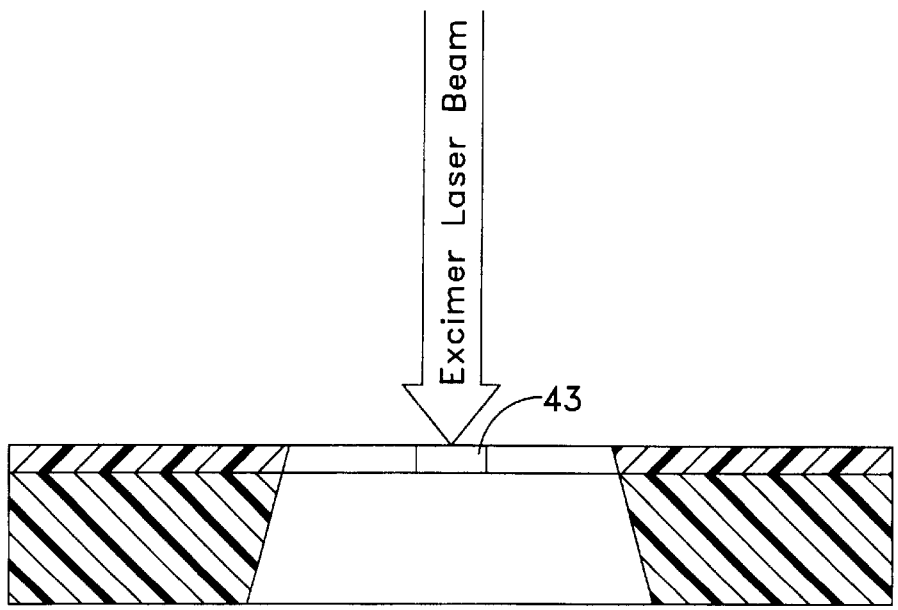
FIG. 3*c* shows schematically in cross section ablating with an excimer laser a gap for releasing the cantilever structure of FIG. 3*a*, with the cross section taken along the line III*c*—III*c* of FIG. 3*d*.

The cantilevered waveguide of example 6 is shown schematically in FIGS. 3a–3d. The exemplary PEV wafer #1 is 25 mils (625 μms) thick. The line drawings were prepared from an SEM image. The main cantilever section denoted by 41 in FIGS. 3a and 3d is 50 mils long by 25 mils wide. The area 42 representing the inertial mass is 110 mils long by 70 mils wide. As indicated in FIG. 3b, a $CO_2$ laser creates most of the contour of the cantilever except for a narrow—approximately 10 mils wide—region 43 at the location where the air gap is subsequently to be formed by excimer laser ablation, as indicated in FIG. 3c. As before, the $CO_2$ laser does not release the cantilever at the narrow region 43, but keeps it suspended from the narrow region 43. The input edge of the waveguide film is denoted by 45 and the output edge of the waveguide film is denoted by 46.

After formation of most of the contour of the cantilever (except the narrow region) by $CO_2$ laser cutting, the PEV wafer #1 is ablated from the uncoated back surface to a depth of 550 μm and width of 50 μm at region 43. The PEV wafer is then ablated from the waveguide-side to a depth of 75 μm and a width equal to that of the desired air gap. The cantilever is released by concurrently ablating the air gap in region 43 of the waveguide film and the VESPEL® material underneath.

The displacement of the cantilever is measured interferometrically. The displacement of a cantilever with an inclined end face changes the length of the optical path. In an exemplary measurement, a section of straight planar waveguide incorporating a micromachined cantilever is inserted in one arm of a fiber optic Mach-Zehnder interferometer. The cantilever is driven with a piezoelectric sheet made from PZT material and located in a plane perpendicular to that of the cantilever. The piezoelectric plate is driven longitudinally near its resonance to simulate acceleration. The resonant frequency of the piezoelectric plate was measured to be 11.523 kHz. Application of a sinusoidal voltage to the piezoelectric plate generated dynamic displacements of the cantilever, which were picked up as optical phase change by the interferometer. The phase measurements were carried out by using of the $J_1, \ldots J_4$ method (V. S. Sudarshanam and K. Srinivasan, "Linear readout of dynamic phase change in a fiber optic homodyne interferometer", Opt. Lett. Vol.14, p. 140, (1989)) which utilizes the fundamental drive frequency $J_1$ and the three harmonics $J_2$, $J_3$ and $J_4$.

An optical interferometric accelerometer incorporating a micromachined cantilevered multi-modal waveguide was demonstrated. The interference could be seen because it took place in the single mode fiber in spite of the multi-modal nature of the waveguide. The single mode pick-up fiber acts as a spatial filter and filters out the higher order modes. The displacement of the cantilever causes a phase change in the optical path of the light passing through the cantilever waveguide. The air gap or pick up fiber or waveguide, i.e. the portion of region 43 adjacent to the ablated air gap, in FIG. 3d may not be necessary.

EXAMPLE 7

Laser Micromachined Cantilever Beam with Diced Input/Output Edges

A cantilevered waveguide similar to that given above in Example 6 was fabricated in PEV wafer #1, except that the input/output edges of the waveguide film in step (b) were diced instead of laser-ablated (not shown).

The cantilevered waveguide of Examples 6 and 7 can be used, for example, in an interferometric optical accelerometer.

Figure 5:
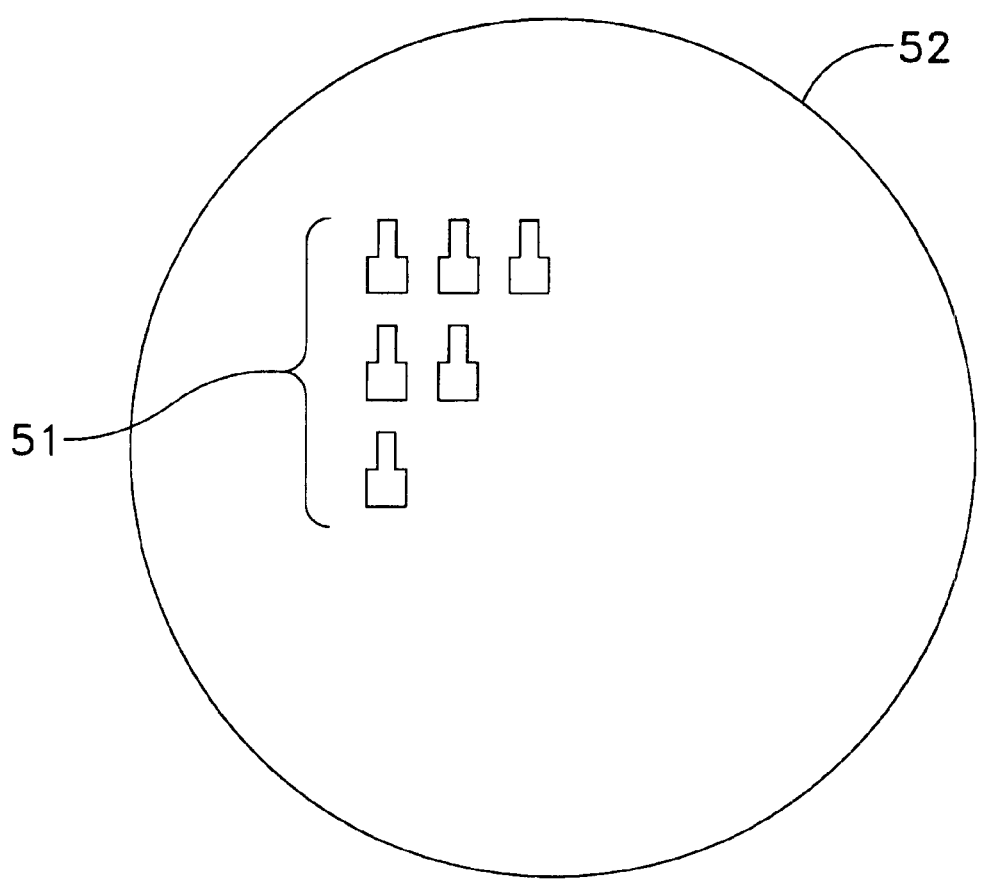
FIG. 5 shows schematically a pattern of cantilevers cut in a polished VESPEL® wafer using a $CO_2$ laser.

FIG. 5 shows a pattern of adjacent cantilevers 51 cut with a $CO_2$ laser in PEV wafer #2 52. This demonstrates that $CO_2$ laser cutting is suitable to produce a large number of cantilevered devices simultaneously on a single substrate and hence is suitable for large scale production.

Figure 4:
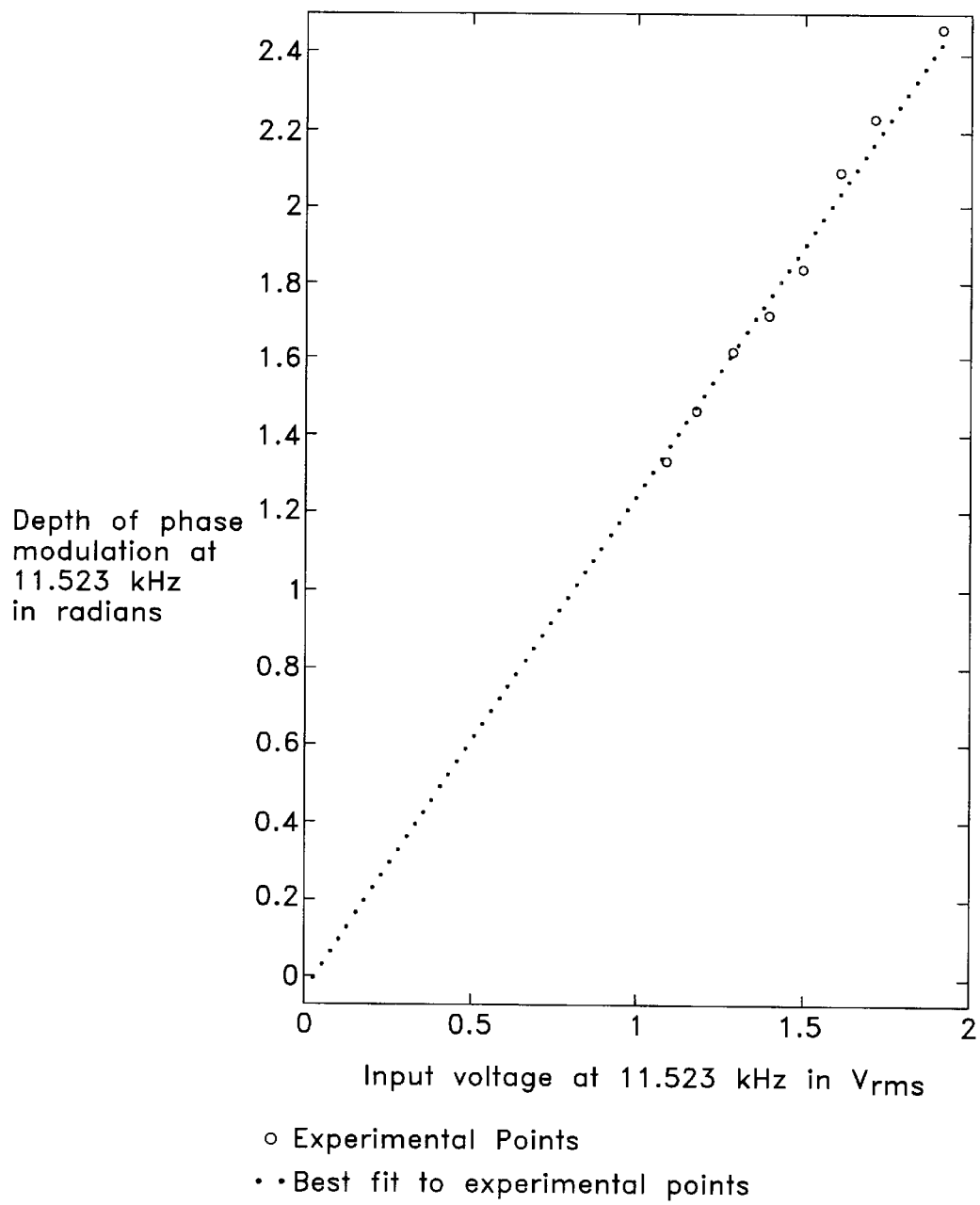
FIG. 4 is a schematic diagram of a phase modulation in radians vs. RMS drive voltage applied to a piezoelectric plate.

As mentioned above, the phase change due to cantilever displacement can be measured using a fiber optic Mach-Zehnder interferometer. The cantilevered waveguide is again excited with a thin PZT piezoelectric plate. FIG. 4 displays a graph of the phase change in radians resulting from the displacement of the cantilevered waveguide vs. the voltage applied to the piezoelectric sheet. A linear fit to this plot provided the value of the phase shifting coefficient, which is defined as the phase modulation depth per unit voltage expressed in rad/V. A value of 1.281 rad/$V_{rms}$ was determined at f=11.523 kHz, corresponding to an optical path length change of 0.127 μm per μm of lateral cantilever tip displacement.

EXAMPLE 8

Fabrication of a Groove for Mounting a Fiber

Figure 6:
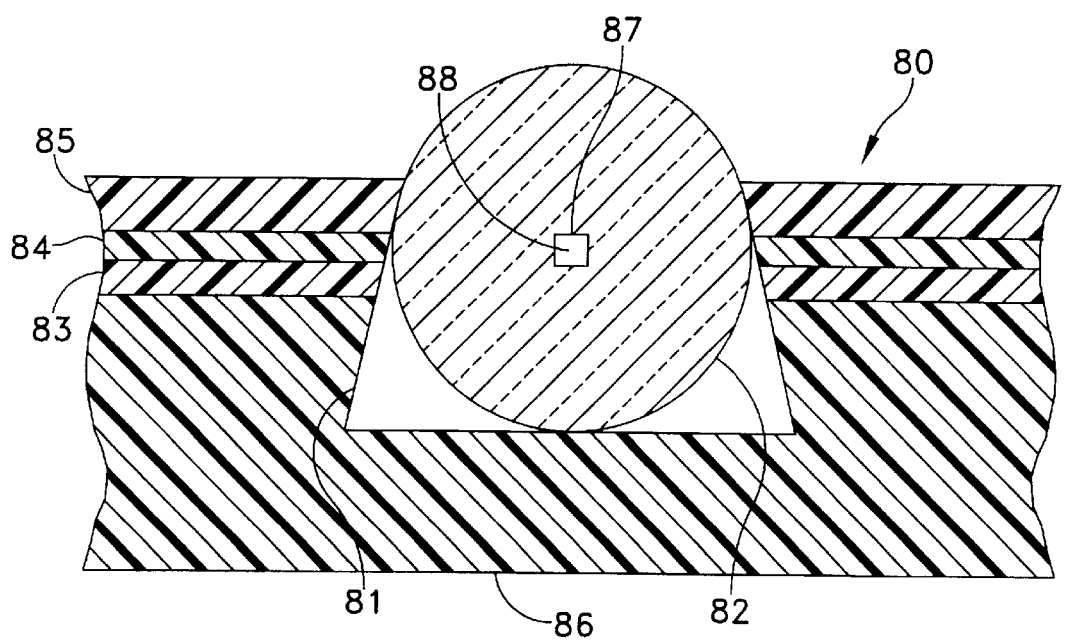
FIG. 6 shows schematically a cross-sectional view of an optical fiber located in a groove laser-machined in a polyimide/polymer laminate.

A groove is fabricated in the organic laminate by laser ablation. The groove is parallel and collinear with the channel waveguide. The end of the channel waveguide at the groove is prepared by laser ablation. The fluence of the ablating laser and the optical delivery system of the ablation machine can be adjusted to yield a natural undercut in polymers in the form of an inverted V-groove which enables the groove to hold the fiber tightly both horizontally and vertically. An optical fiber is inserted in the groove by pressing. It is translated axially until its tip contacts the end of the waveguide. The depth and width of the groove can be controlled very precisely by laser ablation so that the fiber core is located at the vertical level of the waveguide which is deposited on the surface of the substrate, preferably a VESPEL® substrate. The accuracy of the vertical alignment between fiber and waveguide depends on the accuracy with which the groove depth can be controlled. This is very precisely known from knowledge of the ablation rate of the substrate material, the repetition rate of the pulses and the fluence of the laser, i.e. energy per pulse. For example, if the waveguide core layer is centered at a distance of about 10 μm above the substrate surface, then assuming a fiber radius of 62.5 μm, the bottom of the groove must be at a distance of 52.5 μm below the substrate surface. The accuracy of the horizontal alignment between fiber and waveguide depends on the accuracy with which the groove width and location can be controlled. This is very precisely controlled with the use of standard photolithographic processes. This yields the desired accuracy for coupling between single mode fibers and waveguides. A cross section of a polymer laminate 80 comprising a groove 81, fiber 82, and waveguide comprising a first optical buffer (lower cladding) layer 83, a second optical waveguiding (core) layer 84, and a third optical (upper cladding) layer 85 on top of a substrate 86 is shown in FIG. 6. The center of the channel waveguide 87 in the core layer 84 coincides with the center of the fiber 88. The upper cladding layer 85 of the polymer laminate 80 grips the fiber 82 above its horizontal diameter and exerts a downward force on the fiber which holds it in place. The groove can be fabricated in the organic laminate with the use of laser ablation either by direct writing or by imaging through a reticle. Furthermore the groove can be fabricated by laser ablation with the use of an excimer laser, which emits pulses which are typically on the order of nanoseconds long. Alternatively, the groove can be fabricated with lasers which emit pulses which are picosecond or femtosecond long for a more precise control of the groove dimensions.

The foregoing is considered only illustrative of the currently preferred embodiments of the invention presented herein. Since numerous modifications and changes may occur to those skilled in the art, it is not desired to limit the invention to the exact construction used to illustrate the various means comprising the invention.

What is claimed is:

1. A substrate for a circuit structure comprising:
    a planar substrate mass of polyimide material having a first side and a second side, said first side being polished to a surface smoothness between about 0.5 $\mu$inch and 100 $\mu$inch, capable of receiving a circuit structure.

2. The substrate for a circuit structure of claim 1, wherein said surface smoothness is between about 1 $\mu$inch and 50 $\mu$inch.

3. The substrate for a circuit structure of claim 1, wherein said surface smoothness is between about 1 $\mu$inch and 20 $\mu$inch.

4. The substrate for a circuit structure of claim 1, wherein said second side is polished.

5. The substrate for a circuit structure of claim 1, further comprising a first polymer layer applied to said first polished side of said planar substrate mass.

6. The substrate for a circuit structure of claim 5, further comprising an adhesion layer between said first polymer layer and said first polished side.

7. The substrate for a circuit structure of claim 5, wherein said first polymer layer has a refractive index that is greater than the refractive index of said polyimide substrate material.

8. The substrate for a circuit structure of claim 5, further comprising a second polymer layer applied over said first polymer layer, wherein the index of refraction of said second polymer layer is greater than the index of refraction of said first polymer layer.

9. The substrate for a circuit structure of claim 8, wherein said first polymer layer and said second polymer layer comprise an optical waveguide.

10. The substrate for a circuit structure of claim 8, further comprising a third polymer layer applied over said second polymer layer, wherein the index of refraction of said second polymer layer is greater than the index of refraction of said third polymer layer.

11. The substrate of claim 10, wherein the index of refraction of said third polymer layer is about equal to the index of refraction of said first polymer layer.

12. The substrate for a circuit structure of claim 10, wherein said first polymer layer, said second polymer layer and said third polymer layer comprise an optical waveguide.

13. The substrate for a circuit structure of claim 12, wherein said optical waveguide is a single mode waveguide.

14. The substrate for a circuit structure of claim 12, wherein said optical waveguide is a channel waveguide.

15. The substrate for a circuit structure of claim 10, wherein said first polymer layer and said second polymer layer, and said third polymer layer are polyimides.

16. The substrate for a circuit structure of claim 10, wherein said polyimide substrate material, said first polymer layer, said second polymer layer and said third polymer layer have coefficients of thermal expansion of between about $20 \times 10^{-6}/°$ C. and $75 \times 10^{-6}/°$ C.

17. The substrate for a circuit structure of claim 10 wherein said planar substrate mass, said first polymer layer, said second polymer layer and said third polymer layer are cut to form at least one cantilever member having a connected end and a free end opposite said connected end, said free end having a first edge, and an air gap between said free end and said substrate, said substrate having a second edge opposite said first edge, said first edge and said second edge are separated by said air gap.

18. The substrate for a circuit structure of claim 17 wherein said first edge and said second edge are substantially parallel.

19. The substrate for a circuit structure of claim 17 wherein said first edge and said second edge are inclined at an acute angle relative to a normal of said first side of said planar mass.

20. The substrate for a circuit structure of claim 17 wherein said first edge and said second edge are substantially parallel to a normal of said first side of said planar substrate mass.

21. The substrate for a circuit structure of claim 17 wherein said planar substrate mass, said first polymer layer, said second polymer layer and said third polymer layer are diced.

22. The substrate for a circuit structure of claim 17 wherein said planar substrate mass, said first polymer layer, said second polymer layer and said third polymer layer are ablated with a laser.

23. The substrate for a circuit structure of claim 1, wherein said first polished side is highly reflective.

24. The substrate for a circuit structure of claim 23, further comprising a highly reflective layer applied to said first polished side.

25. The substrate for a circuit structure of claim 24, wherein said planar substrate mass and said highly reflective layer are cut to form at least one movable member.

26. A method of preparing a substrate for a circuit structure comprising:
    providing a planar substrate mass of polyimide material having a first side and a second side; and
    polishing said first side to a surface smoothness between about 0.5 $\mu$inch and 100 $\mu$inch.

27. The method of claim 26 further comprising:
    polishing said second side of said planar substrate mass.

28. The method of claim 26 further comprising:
    applying a first polymer layer to said first polished side of said planar mass;
    applying a second polymer layer over said first polymer layer; and
    applying a third polymer layer over said second polymer layer, wherein the index of refraction of said second polymer layer is larger than the index of refraction of said first polymer layer and of said third polymer layer.

29. The method of claim 27 further comprising:
    applying a first polymer layer to said first polished side of said planar mass;
    applying a second polymer layer over said first polymer layer; and
    applying a third polymer layer over said second polymer layer, wherein the index of refraction of said second polymer layer is larger than the index of refraction of said first polymer layer and of said third polymer layer.

30. The method of claim 28, wherein said first polymer layer, said second polymer layer and said third polymer layers form a single mode waveguide.

31. The method of claim 29, wherein said first polymer layer, said second polymer layer and said third polymer layers form a single mode waveguide.

32. The method of claim 30, wherein said single mode waveguide is a channel waveguide.

33. The method of claim 31, wherein said single mode waveguide is a channel waveguide.

34. The method of claim 28 further comprising:
shaping said polyimide substrate mass, said first polymer layer, said second polymer layer and said third polymer layer using at least one laser to form at least one movable member.

35. The method of claim 29 further comprising:
shaping said polyimide substrate mass, said first polymer layer, said second polymer layer and said third polymer layer using at least one laser to form at least one movable member.

36. The method of claim 34 wherein said movable member further comprises a cantilever member having a connected end and a free end opposite said connected end, said free end having a first edge, and an air gap between said free end and said substrate, said substrate having a second edge opposite said first edge, said first edge and said second edge are separated by said air gap.

37. The method of claim 35 wherein said movable member further comprises a cantilever member having a connected end and a free end opposite said connected end, said free end having a first edge, and an air gap between said free end and said substrate, said substrate having a second edge opposite said first edge, said first edge and said second edge are separated by said air gap.

38. The method of claim 36 wherein said step of shaping using a laser further includes:
partially cutting said second side of said planar substrate mass, said first polymer layer, said second polymer layer and said third polymer layer using a first laser emitting in the infrared spectral range; and
completing said cutting of said planar substrate mass, said first polymer layer, said second polymer layer and said third polymer layer using a second laser emitting in the ultraviolet spectral range.

39. The method of claim 37 wherein said step of shaping using a laser further includes:
partially cutting said second side of said planar substrate mass, said first polymer layer, said second polymer layer and said third polymer layer using a first laser emitting in the infrared spectral range; and
completing said cutting of said planar substrate mass, said first polymer layer, said second polymer layer and said third polymer layer using a second laser emitting in the ultraviolet spectral range.

40. The method of claim 38 wherein said first laser is a $CO_2$ laser and said second laser is an excimer laser.

41. The method of claim 39 wherein said first laser is a $CO_2$ laser and said second laser is an excimer laser.

42. The method of claim 38 wherein said first laser is a $CO_2$ laser and said second laser is a quadrupled YAG laser.

43. The method of claim 39 wherein said first laser is a $CO_2$ laser and said second laser is a quadrupled YAG laser.

44. The method of claim 41 further comprising:
forming a groove in said planar substrate mass having a depth, said depth capable of receiving an optical fiber wherein said fiber aligns with said channel waveguide.

45. The method of claim 42 further comprising:
forming a groove in said planar substrate mass having a depth, said depth capable of receiving an optical fiber wherein said fiber aligns with said channel waveguide.

46. The method of claim 44 wherein said step of forming a groove comprises ablating with a pulsed laser having a pulse width.

47. The method of claim 46 wherein said pulsed laser is an excimer laser.

48. The method of claim 46 wherein said pulse width is about a picosecond.

49. The method of claim 46 wherein said pulse width is about a femtosecond.

50. The method of claim 45 wherein said step of forming a groove comprises ablating with a pulsed laser having a pulse width.

51. The method of claim 50 wherein said pulsed laser is an excimer laser.

52. The method of claim 50 wherein said pulse width is about a picosecond.

53. The method of claim 50 wherein said pulse width is about a femtosecond.

54. A method of forming a groove having a precise depth and width in a planar substrate mass of polyimide material comprising:
providing a planar substrate mass of polyimide material having a first side and a second side;
polishing said first side to a surface smoothness between about 0.5 $\mu$inch and 100 $\mu$inch; and
cutting said first side of said planar substrate mass using a pulsed laser, said pulsed laser outputting a predetermined number of pulses to form a groove having a depth and a width capable of receiving an optical fiber.

* * * * *

UNITED STATES PATENT AND TRADEMARK OFFICE
Certificate

Patent No. 6,563,998 B1                                             Patented: May 13, 2003

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: John Farah, Attleboro, MA (US). (US)

Signed and Sealed this Seventeenth Day of July 2007.

RODNEY B. BOVERNICK
*Supervisory Patent Examiner*
Art Unit 2874

UNITED STATES PATENT AND TRADEMARK OFFICE
Certificate

Patent No. 6,563,998 B1                                                              Patented: May 13, 2003

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: John Farah, Attleboro, MA (US).

Signed and Sealed this Twenty-fifth Day of November 2008.

UYEN-CHAU N. LE
*Supervisory Patent Examiner*
Art Unit 2874